United States Patent [19]

Nicolaisen

[11] 3,939,254

[45] Feb. 17, 1976

[54] PROCESS FOR PREPARING ALKALI METAL ORTHOPHOSPHATES AND AMMONIA

[75] Inventor: Bernard H. Nicolaisen, Houston, Tex.

[73] Assignee: Olin Corporation, New Haven, Conn.

[22] Filed: Dec. 30, 1974

[21] Appl. No.: 537,236

[52] U.S. Cl. ............... 423/312; 423/356; 423/305; 423/437
[51] Int. Cl.² C01B 15/16; C01B 25/26; C01C 1/02; C01B 31/20
[58] Field of Search .................. 423/305, 307–313, 423/237, 238, 356, 357, 437, 438

[56] References Cited
UNITED STATES PATENTS

| 1,916,980 | 7/1933 | Horvitz | 423/438 |
| 3,337,297 | 8/1967 | Cook et al. | 423/305 |
| 3,531,242 | 9/1970 | Hayakawa et al. | 423/310 |
| 3,619,133 | 11/1971 | Fukuba et al. | 423/310 |
| 3,826,815 | 7/1974 | Marcovic | 423/356 |

FOREIGN PATENTS OR APPLICATIONS

| 561,708 | 9/1932 | Germany | 423/312 |

Primary Examiner—Oscar R. Vertiz
Assistant Examiner—Gregory A. Heller
Attorney, Agent, or Firm—Robert L. Andersen

[57] ABSTRACT

Aqueous monoammonium phosphate is reacted at elevated temperature with sodium carbonate in a vertical column having vapor-liquid contact means to produce an aqueous solution of sodium ammonium phosphate having a reduced carbon dioxide content. The sodium ammonium phosphate solution is treated in a second such column at elevated temperature and pressure to produce ammonia and an ammonia-free solution of alkali metal orthophosphate having a desired alkali metal to phosphorus molar ratio.

19 Claims, 1 Drawing Figure

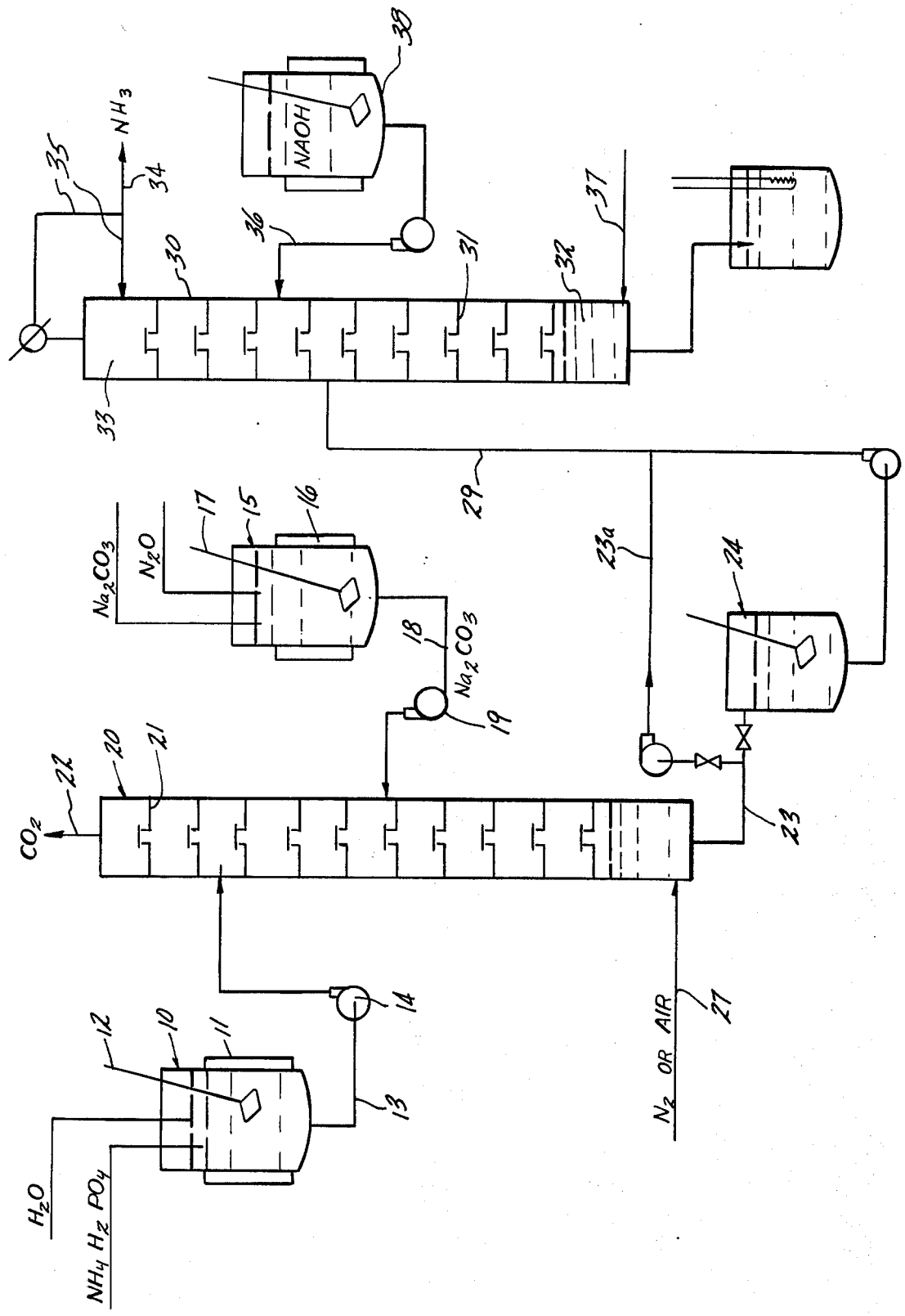

PROCESS FOR PREPARING ALKALI METAL ORTHOPHOSPHATES AND AMMONIA

BACKGROUND OF THE INVENTION

1. Field of Invention

The present invention relates to a process for preparing ammonia and a substantially ammonia-free solution of sodium orthophosphate by reacting aqueous monoammonium phosphate with sodium carbonate in a vertical column having vapor-liquid contact means to form a solution of sodium ammonium phosphate having reduced carbon dioxide levels and thereafter subjecting the sodium ammonium phosphate solution to treatment in a high pressure/temperature column having vapor-liquid contact means to form ammonia and a substantially ammonia-free solution of sodium orthophosphate.

2. Description of the Prior Art

In the prior art, alkali metal phosphates such as monosodium phosphate, disodium phosphate, and trisodium phosphate, solutions thereof and compounds derived therefrom have been commercially prepared by neutralizing furnace grade or wet process phosphoric acid at atmospheric pressure with an alkali metal hydroxide or carbonate such as sodium or potassium hydroxide or carbonate and then further treating the product to form a desired phosphate, polyphosphate, or pyrophosphate.

In such processes an ammonium phosphate is not formed as an intermediate for at least two reasons. Ammonia required for the preparation of an ammonium phosphate intermediate is costly and generally not readily available at the phosphate production site. Secondly, an economical process for utilizing a route involving an ammonium phosphate intermediate would require an efficient, inexpensive method for recovering ammonia for sale or recycle to the process and a suitable ammonia recovery process was not heretofore available.

It is generally known that the degree to which ammonia can be recovered from an aqueous system is a function of the alkalinity of the system. Thus, in the Kjeldahl method for analyzing for ammonia, highly alkaline solutions are employed in order to facilitate the release of ammonia. Likewise, in urea technology use of highly alkaline solutions facilitates substantially complete recovery of ammonia but generally only in combination with carbon dioxide.

In aqueous phosphatic systems the ability to remove ammonia is likewise dependent on the alkalinity of the solution. Thus, at atmospheric pressure complete recovery of ammonia from an ammonium phosphate solution is only feasible in the presence of a high concentration of a base such as sodium hydroxide, for example, in amounts sufficient to provide an Na/P molar ratio of 3 or more. As one decreases the concentration of base, recovery of ammonia becomes less complete and ammonia recovery times increase dramatically. As the Na/P molar ratio is decreased from 3 or more to about 2 or less, ammonia recovery becomes uneconomical due to low yields and extended recovery time.

It is self-defeating to utilize a high Na/P molar ratio to facilitate ammonia recovery during alkali metal phosphate formation due to the fact that the high Na/P molar ratio merely limits the variety of phosphates which can be ultimately formed. For example, if an Na/P molar ratio of 2 or more is utilized to form an orthophosphate solution from an ammonium phosphate, the orthophosphate cannot advantageously be used to form such relatively acidic products as $NaH_2PO_4$, $Na_2H_2P_2O_7$ and $(NaPO_3)_x$ since each require an Na/P molar ratio of 1. Likewise, an orthophosphate solution having an Na/P molar ratio of 2 or more cannot advantageously be utilized as a source material for sodium tripolyphosphate which requires an Na/P molar ratio of about 1.667.

It is thus apparent that if substantially all ammonia could be recovered from relatively acidic ammonium phosphate solutions, for example, those having an alkali metal/P molar ratio below about 2 and preferably as low as about 1, the resulting orthophosphate could advantageously be employed to prepare all phosphates, polyphosphates, and pyrophosphates in which the ratio of alkali metal to P is 1 or more.

It is known, of course, to prepare either monoammonium phosphate or sodium ammonium phosphate from phosphoric acid and there are several patents dealing with processes for accomplishing this and for producing ammonium phosphates of such purity that they can be utilized to prepare high quality alkali metal phosphates.

It is also known to react monoammonium phosphate with sodium hydroxide to produce sodium ammonium phosphate in accordance with the equation:

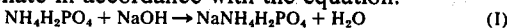

$$NH_4H_2PO_4 + NaOH \rightarrow NaNH_4H_2PO_4 + H_2O \qquad (I)$$

Additionally, it is known to prepare sodium ammonium phosphate according to the following equation:

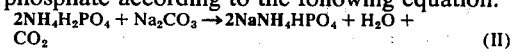

$$2NH_4H_2PO_4 + Na_2CO_3 \rightarrow 2NaNH_4HPO_4 + H_2O + CO_2 \qquad (II)$$

Where it is desired to employ the solution formed according to equation I or II as an intermediate in the preparation of sodium phosphates, equation I would appear to be the route of choice in that it circumvents problems which may arise during a subsequent ammonia recovery step due to the presence of carbon dioxide, carbonates, or bicarbonates. While this would appear to dictate in favor a route utilizing only caustic soda the differential between the price of caustic soda and the price of soda ash or trona as a source of sodium carbonate would dictate in favor of the route of equation II if carbon dioxide could be economically and effectively removed prior to ammonia recovery.

The separation of carbon dioxide from ammonia, however, is notoriously difficult and at best would require one or more additional processing steps. No means has previously been found for thermally separating carbon dioxide from an ammonium phosphate containing reaction mixture without simultaneously separating, and thus losing, a substantial amount of ammonia. If, for example, one attempts to heat the mixture or conduct the reaction at elevated temperature up to about 40% of the ammonia will be expelled with the carbon dioxide. This in and of itself represents a substantial loss of ammonia and to avoid this loss, an additional separating step would be required. Furthermore, as the carbon dioxide/ammonia mixture cools, carbamates may form, precipitate, and plug process lines. The formation of carbamates represents an unwarranted loss of ammonia and also increases corrosion in process lines and processing equipment and thus substantially decreases its useful life.

In addition, the presence of excessive amounts of carbon dioxide during a high temperature ammonia recovery step will complicate ammonia recovery and/or contaminate either the ammonia or the solution of sodium ammonium phosphate or both.

In order to avoid these losses and complications and to take advantage of the price differential between soda ash and caustic soda it is the principal object of the present invention to provide a process for conversion of an aqueous monoammonium phosphate to a substantially ammonia-free solution of sodium orthophosphate wherein carbon dioxide and ammonia are each separately and economically recovered.

SUMMARY OF THE INVENTION

It has been found that this object may be achieved by first reacting monoammonium phosphate with sodium carbonate under conditions conducive to the release of substantially ammonia-free carbon dioxide to produce a solution of sodium ammonium phosphate having a reduced carbon dioxide content, then subjecting the sodium ammonium phosphate solution to treatment in a high pressure/temperature column to recover ammonia and an aqueous solution of sodium orthophosphate having a desired Na/P molar ratio in the range of 1–2 which is substantially free of ammonia.

DETAILED DESCRIPTION

The attached drawing is a diagram showing the general features of the apparatus for use in the present invention and showing the preferred flow of materials as taught herein.

Monoammonium phosphate for use in the present process may be prepared in any desired manner, for example, by ammoniation of furnace grade phosphoric acid or by ammoniation of wet process phosphoric acid as taught, for example, in U.S. Pat. No. 3,388,966.

An aqueous solution is prepared containing any desired amount of monoammonium phosphate. Suitably, any concentration up to about 70 wt. %, advantageously 10 to 70 wt. %, may be employed. It is preferred that a fairly concentrated solution be utilized and accordingly, the solution may be heated if desired to any desired temperature up to its boiling point, 110–111°C. at maximum concentration, to increase the amount of monoammonium phosphate which may be dissolved therein. Generally, such heating will not cause a noticeable loss of ammonia but if a noticeable odor of ammonia develops the temperature should be reduced slightly to minimize ammonia losses.

A slurry of monoammonium phosphate may also be employed if desired if a column provided with vapor-liquid contact means capable of handling solids it utilized or if the concentration of monoammonium phosphate is limited to a concentration which will readily dissolve when subjected to elevated temperature in the column.

Referring to the drawing a storage tank 10 of any suitable size and shape is provided for storing the aqueous monoammonium phosphate. Tank 10 is suitably heated by any suitable means, for example, by electrical heaters 11. Tank 10 is suitably provided with an agitator 12 and an outlet communicating with feed line 13 which is provided with metering pump 14.

Any suitable source of sodium carbonate, for example, soda ash, trona, or sodium bicarbonate, but preferably soda ash, may be utilized as a solution or slurry in the present process. The solution or slurry may be heated if desired prior to introduction into the column. The solution or slurry is suitably stored in storage tank 15 which is heated by electrical heaters 16. Tank 15 is suitably provided with agitator 17 and with an outlet communicating with feed line 18 provided with metering pump 19.

An atmospheric pressure column 20 is preferred for the conversion of monoammonium phosphate to sodium ammonium phosphate and, as shown, is an elongated vertical column having suitable vapor-liquid contact means 21. Preferably, the column has a height substantially greater than its width, for example, in a height to width ratio of 10:1 to 250:1 depending on the type and efficiency of the vapor-liquid contact means employed. Suitable vapor-liquid contact means 21 includes, for example, plates, sieves, beads, or other packing materials all of which are well known to those skilled in the art.

A typical column for use in the invention on a small scale is one which is, for example, 2 inches in diameter by 20 feet tall made of stainless steel or any other suitable material. As shown in the drawing the column is provided with vapor-liquid contact means 21 throughout a major portion of its length. A vapor line 22 exits from the top of the tower for removal of carbon dioxide and water vapor and a product removal line 23 exits from the bottom of the tower to a sodium ammonium phosphate storage tank 24 or to a further processing station (line 23a).

Column 20 may be maintained at any desired pressure, but it is clearly preferable to operate at atmospheric pressure. No substantial advantage is realized by operating at elevated pressure or under vacuum. It is preferable, however, to operate the column at elevated temperature and for this purpose a bottom reboiler or other suitable heating means (not shown) is employed. Suitably, an elevated temperature in the range of 125°F. to 250°F. is advantageously employed and there is no reason to exceed these limits unless it is desired to reduce carbon dioxide to extremely low values, for example, below about 25–50 ppm. If operating in the lower portion of this range, however, for example, in the range of 125°F. to 175°F., it may be desirable to utilize an inert stripping gas such as air or nitrogen. This is generally not required when operating in the upper portion of the range (175°C. – 250°C.) particularly if the boiling point of the solution is attained but may nevertheless be utilized if desired. If a stripping gas is utilized it is preferably introduced to the lower portion of the column, for example, via line 27. Suitably the stripping gas may be preheated by any known means prior to introduction.

The aqueous monoammonium phosphate is advantageously introduced into the upper half the first column (20), preferably at a point near the top of the column in order to maximize efficiency thereof. A small space above the injection point, for example 1–3 feet is all that is required for the disengagement of carbon dioxide.

The aqueous sodium carbonate is introduced into the tower at a level below the point of introduction of the monoammonium phosphate solution via line 18 at a rate sufficient to provide and maintain in column 20 a reaction mixture having an Na/P molar ratio in the range of about 0.5–1.5, advantageously 0.6–1.2. Most efficient carbon dioxide stripping appears to be attained by utilizing feed rates which provide an Na/P molar ratio in the range of 0.7–1.1 at a temperature of about 170°C. to about 225°F.

Upon introduction of the monoammonium phosphate and sodium carbonate the former is permitted to flow downwardly in the column into contact with the sodium carbonate which has been introduced below which is also flowing downwardly toward the bottom of the column. Upon such co-current contact the reaction according to equation II, supra, takes place causing the release of carbon dioxide, water and ammonia vapors. The vapors thus released rise in the column in countercurrent contact with the reaction mixture and eventually reach a level where they are in contact only with the monoammonium phosphate solution. At this point any free ammonia is converted to ammonium ion, absorbed into solution and thus removed from the ascending vapors and returned to the reaction mixture to be retained in the resulting bottoms product. The by-product $CO_2$ is either vented or recovered, suitably together with water vapor and is substantially ammonia free; that is to say the overhead vapors contain an ammonia content of about 0–50 ppm, advantageously 0–25 ppm, preferably 0–5 ppm and ideally less than 1 ppm.

A bottoms product recovered from the bottom of the first column (20) via line 23 is an aqueous solution of reduced carbon dioxide content corresponding to sodium ammonium phosphate, i.e., having the approximate formula $Na_x(NH_4)_yH_zPO_4$ wherein $x$ is 0.5–1.5, desirably 0.6–1.2, preferably 0.7–1.1, $y$ is about 1 (representing substantially all ammonia present in the monoammonium phosphate feed stream) and $z$ equals a value not less than zero equal to $3 - (x + y)$. The carbon dioxide content of the bottoms product is suitably 0–500 ppm, preferably 0–100 ppm. If the carbon dioxide is not recovered for re-sale or re-use, substantially higher levels are permissible in the liquid product but at present it is not known at what level the carbon dioxide becomes a problem insofar as ammonia losses or complications arising in ammonia recovery are concerned. It is known, however, that one can satisfactorily recover anhydrous ammonia without incurring undue losses due to carbamate formation if the carbon dioxide level is reduced to below about 500 ppm. As shown in the accompanying example, levels well below this are attainable in accordance with the present invention.

The bottoms product recovered from atmospheric pressure column 20 may be transferred to storage vessel 24 and fed via line 29, as needed, to a second vertical column 30 which is maintained at elevated temperature and pressure and which is operated at conditions conducive to the recovery of ammonia present in the solution and to the conversion of sodium ammonium phosphate to a solution of sodium orthophosphate having the composition $Na_xH_{3-x}PO_4$ wherein $x$ is the value of the Na/P molar ratio selected for operation of the second column.

In the preferred embodiment the bottoms product from column 20 is introduced to the second column 30 as a separate feed stream 29. Aqueous sodium hydroxide is then introduced to column 30 at a rate sufficient to contact and mix with the bottoms product and to provide a reaction mixture therein having a selected Na/P molar ratio in the range of 1–2. It is to be noted that where the Na/P molar ratio of the sodium ammonium phosphate solution is 1 or more the process is operative utilizing little or no sodium hydroxide, making it possible to obtain a product having a Na/P molar ratio as low as 1.

Alternatively, the bottoms product may be contacted by and premixed with the requisite amount of sodium hydroxide prior to introduction into column 30 to preform the reaction mixture. The reaction mixture is then fed as a single feed stream to column 30 where it is subjected to the conditions hereinafter described.

It is preferable, however, that any adjustment in the Na/P ratio be made by introducing aqueous sodium hydroxide via line 36 into column 30 at the same level or at a level above that at which the bottoms product of column 20 is introduced, the sodium hydroxide being introduced at a rate sufficient to produce and maintain in the second column a second reaction mixture having a selected Na/P molar ratio in the range of 1–2. The caustic introduced through second feed stream 36 is permitted to flow downwardly in column 30 in or into continuous co-current contact and to react with the bottoms product of columm 20.

Referring to the drawing there is shown a column 30 suitable for use for recovering ammonia from the reaction mixture. A suitable column is one which is adapted for high temperature/high pressure operation, preferably one which is made of a corrosion resistant material such as Hastalloy C. The column is substantially vertical and has a height substantially greater than its diameter, for example, in a ratio of from 10:1 to 250:1, the actual height depending on the type and efficiency of the vapor-liquid contact means used therein, the point of introduction and the results which are desired.

Suitable vapor-liquid contact means 31 are positioned throughout the reaction zone of the column and may include, for example, seives, plates, beads, or packing as desired, all of which are well known in the art.

A typical column for laboratory demonstration of the process is one which is 2 inches in internal diameter by about 20 feet tall. As shown in the drawing, the tower is provided with vapor-liquid contact means throughout a major portion of its length. A small unpacked section 32 is left at the bottom of the tower for accumulation of a suitable level of the bottoms product and an ammonia rectification section 33 is left open in the top of the tower. The top of the tower is provided with a condenser/splitter for recovery and recycle of ammonia via lines 34 and 35 respectively.

The amount of packing or other vapor-liquid contact means above line 36 and the reflux ratio via line 35 will determine the ultimate purity of ammonia recovered via line 34 and this purity may be varied from anhydrous ammonia to agricultural grade ammonia as desired, a greater degree of purity being attained as the number of theoretical plates or reflux ratio or both is increased.

The column 30 is designed for high pressure operation in order to attain the temperatures necessary to strip ammonia from the reaction mixture. It is preferable that substantially all ammonia be stripped from the reaction mixture to produce a bottoms product substantially free thereof. For purposes of the present invention the bottoms product is considered to be substantially free of ammonia if about 90–100% desirably 95–100%, preferably 99–100% of the ammonia in the reaction mixture is removed. The column must be operable at a pressure of at least about 130 p.s.i.g. and preferably up to about 500 p.s.i.g. in order to attain this degree of ammonia removal. At lower pressures within this range, temperatures obtainable in the column will not permit complete removal of all ammonia present in the reaction mixture. However, the amount of ammonia removed at lower temperatures in the range may be substantially increased by supplying or increasing the supply of stripping gasses to the column for example, through line 37.

Suitable stripping gasses include oxygen, air or nitrogen or other inert gasses which will not contaminate the ammonia recovered from the top of the tower or react with the reaction mixture. Carbon dioxide is preferably to be avoided since its presence tends to increase corrosion in the column, complicate ammonia recovery and contaminate the bottoms product. Oxygen or air is preferred since either or both tend to passivate the metal of the column against the corrosive effect of ammonia solutions and/or vapors therein.

As pressure in the column is increased, up to about 500 p.s.i.g. suitably 200–500 p.s.i.g., temperatures obtainable therein also increase, thus increasing the efficiency of ammonia removal from the reaction mixture. At a pressure in the range of 300–500 p.s.i.g., ammonia content of the bottoms product is not more than about 1 ppm. Little, if any, advantage will be realized by utilizing pressures above about 400–500 p.s.i.g. although there is no technical reason why one could not do so.

Temperature in the column also affects the efficiency of ammonia removal. For most economical operation the column is operated at the boiling point of the reaction mixture at the selected pressure and heat is provided by any known means, for example, by a bottom reboiler (not shown). By operating at this temperature water is split out of the reaction mixture and acts to strip ammonia therefrom. The ammonia is then rectified to any desired degree in the upper part of the column and water returned to the liquid phase. Supplemental stripping gas is generally not required but in the event it is needed, it may be supplied via line 37.

Alternatively, an elevated temperature below the boiling point of the reaction mixture suitably from 150°F. up to the boiling point desirably 200°F. to the boiling point, preferably 250°F. to the boiling point may be employed. Stripping gas is then preferably supplied via line 37 and serves as the vehicle for removal of ammonia from the mixture. The degree of ammonia removal will thus depend in part on the volume of stripping gasses supplied and in part on the liquid temperature.

The alkalinity of the reaction mixture also plays a role in the degree to which ammonia is removed from the reaction mixture. At high alkali metal to phosphorus molar ratios ammonia is more readily removed than where the reaction mixture is more acidic. Increasing the alkali metal content, however, is not a commercially acceptable means for recovering the ammonia since, as indicated above, the high Na/P ratios in the reaction mixture merely limit the variety of phosphates which can be derived. It is far more desirable to operate at Na/P molar ratios in the range of 1–2, preferably 1–1.75 and simultaneously be able to remove substantially all, from 90 to 100%, ammonia present in the reaction mixture. This can be achieved in accordance with the present invention even at an Na/P molar ratio as low as 1 whereas at atmospheric pressure less than about 40% of the available ammonia could be removed utilizing such a low ratio.

The sodium ammonium phosphate bottoms product is introduced to column 30 via line 29 preferably at an intermediate level to allow space above for ammonia rectification and disengagement. Preferably the solution is introduced continuously to provide continuous contact with the alkali metal hydroxide solution.

The sodium hydroxide solution is introduced into the column via line 36 from storage vessel 38 preferably at the same level or at a level above the level at which the sodium ammonium phosphate is introduced but sufficiently below the top of the column to allow for rectification and disengagement of ammonia.

The sodium hydroxide and sodium ammonium phosphate solutions are each permitted to flow gravitationally downward in or into cocurrent contact to form a second reaction mixture and to react to form a solution of sodium orthophosphate having a sodium to phosphorus molar ratio in the range of 1–2, this ratio being determined by the rate at which the ammonium phosphate and alkali metal hydroxide are introduced.

During the reaction and thereafter as the reaction mixture flows downward toward the bottom of the tower, ammonia is released and flows countercurrently to the top of the tower together with water vapor and/or any stripping gasses which have been supplied via line 37. As the vapors rise in the column carbon dioxide is removed due to the contact and scrubbing action of the sodium hydroxide. If the sodium hydroxide is injected at a level above the level at which the bottoms product of the first column is injected maximum scrubbing efficiency and thus maximum $CO_2$ removal is attained. Adequate scrubbing action is also attained if the sodium hydroxide is introduced at the same level as the sodium ammonium phosphate. However, if carbon dioxide levels are relatively low or if it is not critical to the process in question to obtain ammonia which is for all practical purposes free of carbon dioxide, the caustic bottoms product may be injected at a lower level but little, if any, scrubbing action occurs. Water vapor may be removed to any desired degree in the vapor-liquid contact zone above line 36 by increasing or decreasing the number of theoretical plates above this point and/or by increasing or decreasing the reflux ratio via line 35. The ammonia is recovered via line 34, preferably as pure anhydrous ammonia.

The bottoms product of the second column comprises an aqueous solution of sodium orthophosphate having an Na/P molar ratio in the range of 1–2, preferably 1–1.75, corresponding to the ratio at which the sodium ammonium phosphate and sodium hydroxide are introduced to the column. At least 90–100% and preferably 99–100% of available ammonia will have been removed and simultaneously recovered as a separate overhead product.

If one wishes to obtain the full spectrum of phosphates it is most preferred to operate the columns at an Na/P molar ratio which will produce an orthophosphate having an Na/P molar ratio in the range of 1–1.3 from which monosodium phosphate may be obtained directly. All other phosphates, polyphosphates and pyrophosphates are readily prepared therefrom by simply adjusting the Na/P molar ratio to a higher value with sodium hydroxide and treating the adjusted solution in accordance with known principles. In order to minimize the use of sodium hydroxide the first column is operated in the upper part of the 0.6–1.2 range, for example, at 0.9–1.2. If operated at an Na/P ratio of 1 or more sodium hydroxide may be deleted entirely from the second column, but this technique should only be employed where the $CO_2$ scrubbing action of caustic in the second column is not required. Generally it will be preferred to operate the first column at a value of just under 1 and to use a small quantity of caustic in the second column i.e., that amount necessary to bring the Na/P molar ratio to within the range of 1–1.3.

EXAMPLE

An aqueous solution containing 42.5 wt. % reagent grade monoammonium phosphate, preheated to 160°F. was introduced into a 2-inch by 2-foot first column packed with ¼ inch Pro-pack packing made of stainless steel 316 mesh. This packing was estimated to be equivalent to about 120 theoretical plates. The solution was introduced at a level of about 2 feet below the top of the packed portion of the tower at a rate of about 150 cc/min. An aqueous solution of soda ash containing 23 wt. % $Na_2CO_3$ was introduced at a level of about 10 feet from the top of the packed portion of the tower at a rate of 120 cc per minute. The bottoms temperature was maintained at 205°F.

The bottoms product was a solution of sodium ammonium phosphate having an Na/P molar ratio of about 0.77, and an ammonia to P ratio of about 1. Concentration of carbon dioxide in the solution was less than 100 ppm. VPC analysis of the overhead vapors indicated an ammonia content of less than 500 ppm, the limit of detectability. A microkjeldahl analysis, sensitive to 1 ppm, indicated no detectable ammonia in the overhead vapors.

The bottoms product containing 35 wt. % sodium ammonium phosphate was introduced at the midpoint of a second such column which was maintained at a bottoms temperature of 450°F. at a pressure of 400 p.s.i.g. The column was equipped with an overhead condenser, reflux splitter and bottom reboiler. Introduction was at a rate varying from 40 to 85 cc per minute. A 49% caustic solution was introduced at a rate of about 5 cc per minute at a level 2 feet higher. Anhydrous ammonia was recovered from the top of the tower and condensed with water at ambient temperature. The bottoms product was a solution of sodium phosphate containing 1–3 ppm ammonia and having an Na/P molar ratio varying from 1.37 to 1.77.

I claim:

1. A process for preparing ammonia and a substantially ammonia-free solution of sodium orthophosphate comprising:
   a. introducing aqueous monoammonium phosphate into a substantially vertical first column provided with vapor-liquid contact means,
   b. introducing aqueous sodium carbonate into said first column at a level below that at which said monoammonium phosphate is introduced at a rate sufficient to maintain therein an Na/P molar ratio in the range of 0.5–1.5,
   c. permitting said monoammonium phosphate to flow downwardly into continuous co-current contact and react with said sodium carbonate at a temperature of 125–250°F.,
   d. removing overhead substantially ammonia-free carbon dioxide and separately recovering a bottoms product comprising a solution of sodium ammonium phosphate having a reduced carbon dioxide content,
   e. contacting said bottoms product with sufficient sodium hydroxide to provide a reaction mixture having a selected Na/P molar ratio in the range of 1–2,
   f. stripping ammonia from said reaction mixture at elevated temperature and at a pressure in the range of 130 to 500 p.s.i.g. in a second column having vapor-liquid contact means, and
   g. recovering from said second column an overhead product comprising said ammonia and a bottoms product comprising a solution of sodium orthophosphate having the selected Na/P molar ratio.

2. The process of claim 1 wherein said Na/P molar ratio in said first column is 0.6–1.2.

3. The process of claim 1 wherein the selected Na/P molar ratio in said second column is in the range of 1–1.75.

4. The process of claim 1 wherein the pressure in said second column is in the range of 200–500 p.s.i.g.

5. The process of claim 1 wherein the elevated temperature in said second column is a temperature in the range of 150°F. up to the boiling point of the reaction mixture.

6. The process of claim 5 wherein said temperature is in the range of 250°F. up to the boiling point of said reaction mixture.

7. The process of claim 1 wherein said first column is operated at atmospheric pressure, wherein the pressure in said second column is 300–500 p.s.i.g. and wherein the temperature in said second column is in the range of 250°F. up to the boiling point of the reaction mixture.

8. A process for preparing ammonia and a substantially ammonia-free solution of sodium orthophosphate comprising:
   a. introducing aqueous monoammonium phosphate into a substantially vertical first column provided with vapor-liquid contact means,
   b. introducing aqueous sodium carbonate into said first column at a level below that at which said monoammonium phosphate is introduced at a rate sufficient to maintain therein an Na/P molar ratio in the range of 0.5–1.5,
   c. permitting said monoammonium phosphate to flow downwardly in said column into continuous co-current contact and react with said sodium carbonate at a temperature of 125°– 250°F.,
   d. removing substantially ammonia-free carbon dioxide overhead and recovering a bottoms product comprising an aqueous solution of sodium ammonium phosphate having a reduced carbon dioxide content,
   e. introducing said bottoms product into a second column provided with vapor-liquid contact means,
   f. introducing aqueous sodium hydroxide into said second column at the same level or at a level above that at which the bottoms product of said first column is introduced at a rate sufficient to maintain in said second column a reaction mixture having a selected Na/P molar ratio of in the range of 1–2,
   g. permitting said sodium hydroxide to flow downwardly in continuous co-current contact with the bottoms product of said first column and to react with said sodium ammonium phosphate at elevated temperature and at a pressure in the range of 130–500 p.s.i.g.,
   h. recovering an overhead product comprising said ammonia and recovering from the bottom of said column a substantially ammonia-free solution of sodium orthophosphate having the selected Na/P molar ratio.

9. The process of claim 8 wherein said Na/P molar ratio in said first column is in the range of 0.6–1.2.

10. The process of claim 8 wherein said selected Na/P molar ratio in said second column is in the range of 1–1.75.

11. The process of claim 8 wherein the pressure in said second column is in the range of 200–500 p.s.i.g.

12. The process of claim 8 wherein the elevated temperature in said second column is in the range of 150°F. up to the boiling point of the reaction mixture.

13. The process of claim 12 wherein said temperature is in the range of 250°F. up to the boiling point of said reaction mixture.

14. The process of claim 8 wherein said first column is operated at atmospheric pressure, wherein the pressure in said second column is 300–500 p.s.i.g. and wherein the temperature in said second column is in the range of 250°F. up to the boiling point of said reaction mixture.

15. A process for preparing anhydrous ammonia and a substantially ammonia-free solution of sodium orthophosphate comprising:
   a. introducing aqueous monoammonium phosphate into a substantially vertical first column provided with vapor-liquid contact means,
   b. introducing aqueous sodium carbonate into said first column at a level below that at which said monoammonium phosphate is introduced at a rate sufficient to maintain in said column a reaction mixture having a selected Na/P molar ratio of 0.6–1.2,
   c. permitting said monoammonium phosphate to flow downwardly in said chamber in continuous co-current contact and react with said sodium carbonate at a temperature of 125°–250°F.,
   d. removing substantially ammonia-free carbon dioxide overhead and recovering a bottoms product comprising an aqueous solution of sodium ammonium phosphate having a reduced carbon dioxide content,
   e. introducing the solution of sodium ammonium phosphate from said first column into a second column provided with vapor-liquid contact means and stripping ammonia therefrom at elevated temperature and at a pressure in the range of 130–500 p.s.i.g while permitting said solution to flow downwardly in said second column,
   f. recovering an overhead product comprising said ammonia and separately recovering a bottoms producg comprising a substantially ammonia-free solution of sodium orthophosphate having an Na/P molar ratio in the range of 1–1.3.

16. The process of claim 15 wherein said overhead product is substantially anhydrous ammonia.

17. The process of claim 15 wherein the pressure in said second column is in the range of 200–500 p.s.i.g.

18. The process of claim 15 wherein the elevated temperature in said second column is in the range of 150°F. up to the boiling point of said solution.

19. The process of claim 16 wherein said temperature is from 250°F. up to the boiling point of the reaction mixture in said second column at the selected pressure therein.

* * * * *